United States Patent [19]

Rückert

[11] Patent Number: 6,071,036
[45] Date of Patent: Jun. 6, 2000

[54] DEVICE FOR HOLDING TWO STRUCTURAL PARTS IN A SPACED RELATIONSHIP TO EACH OTHER

[75] Inventor: Edvard Rückert, Velbert, Germany

[73] Assignee: Ewald Witte GmbH & Co. KG, Velbert, Germany

[21] Appl. No.: 08/939,507

[22] Filed: Sep. 29, 1997

[30] Foreign Application Priority Data

Oct. 21, 1996 [DE] Germany .......................... 196 43 407

[51] Int. Cl.⁷ .................................................. F16B 5/00
[52] U.S. Cl. ............................ 403/322.4; 403/7; 403/12; 248/634
[58] Field of Search ................................. 403/7, 12, 334, 403/348, 322.1, 322.4, 408.1, 409.1; 248/634; 292/34, 36, 46, 47, 48, 49; 411/535, 536; 296/76, 192, 194

[56] References Cited

U.S. PATENT DOCUMENTS

| | | | |
|---|---|---|---|
| 2,460,961 | 2/1949 | Wilson | 292/48 |
| 2,899,703 | 8/1959 | Johnson | 403/7 X |
| 3,127,186 | 3/1964 | Van Renssen | 403/7 X |
| 3,601,434 | 8/1971 | Fargo et al. | 292/46 |
| 4,362,420 | 12/1982 | Van Der Veken | 403/12 X |
| 4,682,906 | 7/1987 | Ruckert et al. | 403/409.1 |
| 5,288,191 | 2/1994 | Ruckert et al. | 403/409.1 X |
| 5,310,276 | 5/1994 | Bergers et al. | 403/348 X |

FOREIGN PATENT DOCUMENTS

| | | | |
|---|---|---|---|
| 0176663 | 7/1988 | European Pat. Off. | |
| 372388 | 3/1923 | Germany | 411/536 |
| 1341885 | 12/1973 | United Kingdom | 403/334 |

*Primary Examiner*—Harry C. Kim
*Attorney, Agent, or Firm*—Martin A. Farber

[57] ABSTRACT

A device (1) for holding two structural parts in a spaced relationship with respect to each other, having a spacer for filling the distance between the two structural parts, which spacer has a support part (2) which can be brought into a position fixed in rotation with respect to the second structural part (7) and a rotary drive part (3) which can be displaced axially with respect to the support part (2) by rotation. The support part (2) and rotary drive part (3) rest on a helical engagement surface (14, 17) which has a slope which is opposite the slope of a thread of a screw (11) which, upon being screwed into an axial opening (15) in the rotary drive part (3) carries the latter therealong. An engagement surface (17) of the rotary drive part (3) continues into a rubber bumper (18) which extends beyond the screw (11) in axial direction, in particular for supporting an engine hood, a trunk door, or the like of a motor vehicle in a closed position of the engine hood with the engine hood flush with the adjoining parts of the body.

10 Claims, 2 Drawing Sheets

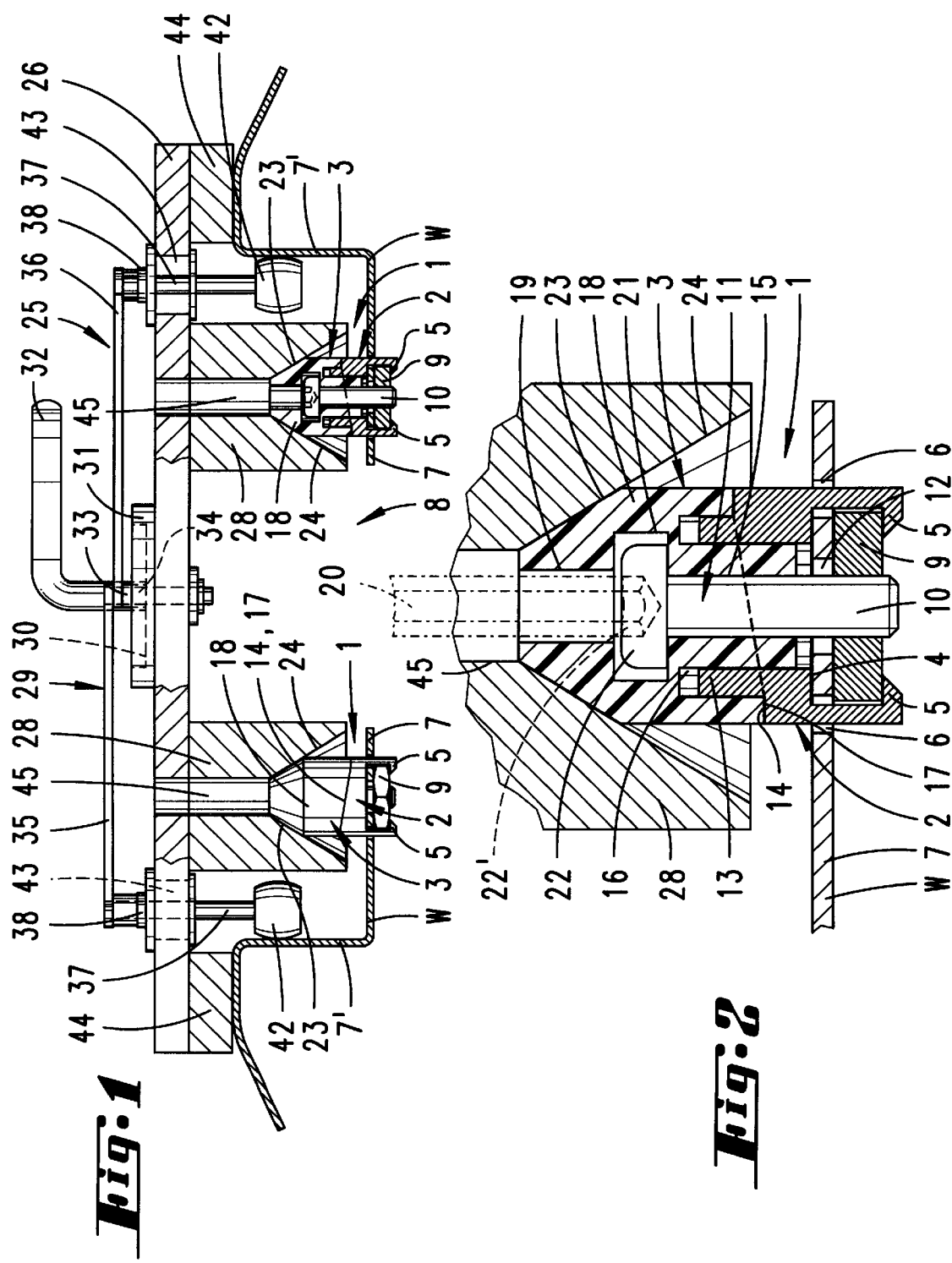

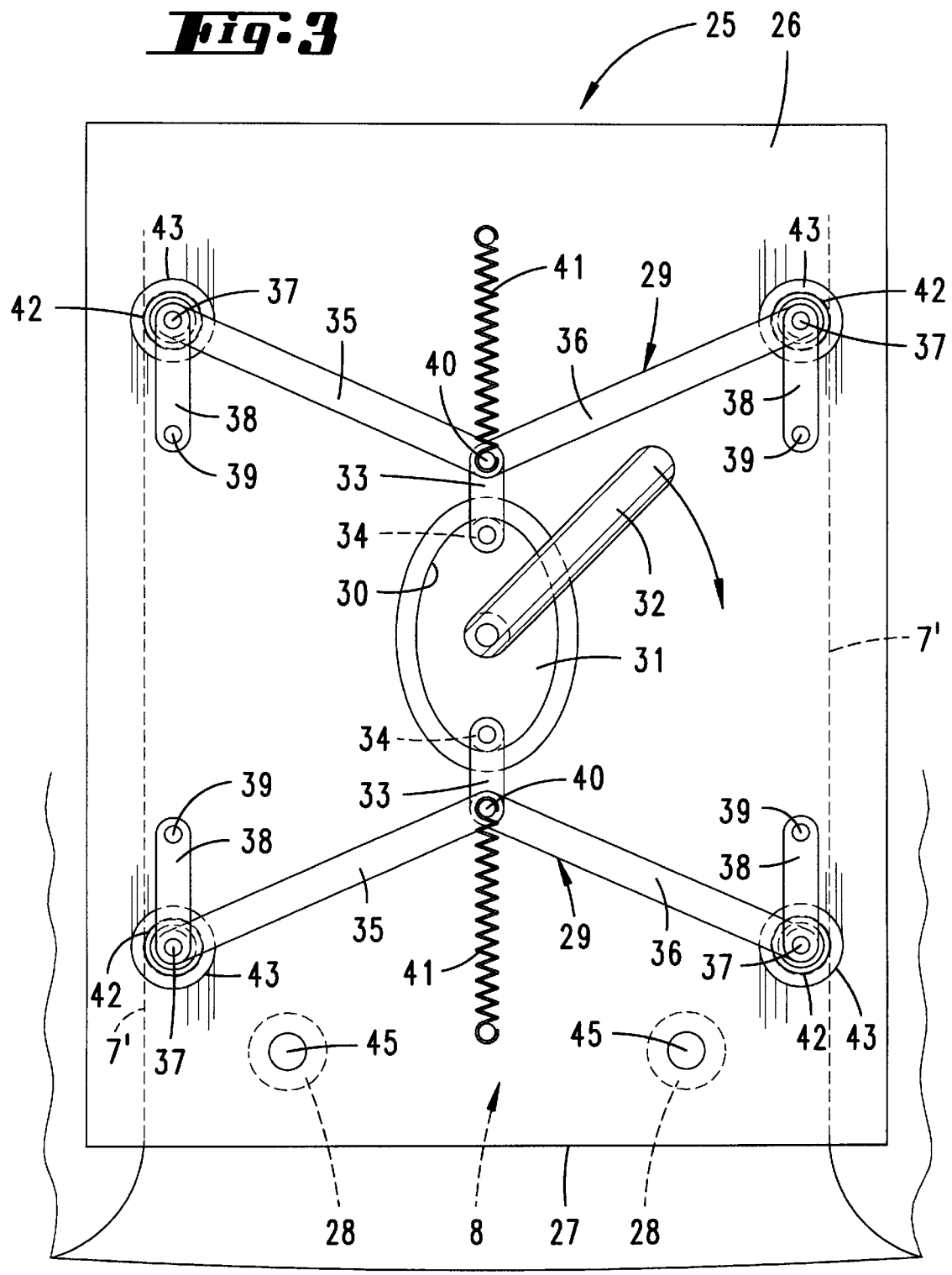

DEVICE FOR HOLDING TWO STRUCTURAL PARTS IN A SPACED RELATIONSHIP TO EACH OTHER

FIELD AND BACKGROUND OF THE INVENTION

The present invention relates to a device for holding two structural parts in a spaced relationship to each other which has a spacer for filling the space between the two structural parts, the spacer having a support part which can be brought into a position fixed in rotation with respect to the first structural part and a drive part which is displaceable axially with respect to the support part by rotation, the support part and the drive part resting against each other on a helical engagement surface which has an inclination which is opposite to the inclination of a thread of a screw which, when screwed into an axial opening in the drive part, carries the latter along with it.

From EP-A1 0 176 663 a device of this type is known which has a support part which can be brought into a position fixed in rotation with respect to the first structural part. The helical engagement surface of the drive part rests on a helical engagement surface of said support part. The support part and the drive part lie one behind the other in axial direction, a screw which passes centrally through the two parts having a thread opposite that of the engagement surface. In the case of a right-hand screw, the engagement surface is developed as a left-hand thread. Accordingly, upon the screwing-in of the screw the screw moves the rotary drive part along by frictional lock of its external thread in the opening in the rotary drive part, so that the two engagement surfaces slide on each other and the end surface of the rotary drive part strikes against the second structural part, together with the fact that the distance between the two structural parts is filled up. Further screwing-in of the screw then no longer leads to a driving of the rotary drive part, so that the screw can be screwed in all the way and enters, on the opposite side, into a corresponding internal thread of the second structural part, as a result of which the two structural parts are attached to each other.

SUMMARY OF THE INVENTION

An object of the invention is to broaden the field of use of a device of this type.

This object is first of all achieved essentially in a device having the features set forth in claim 1, it being characterized by the fact that the engagement surface of the rotary drive part continues into a rubber bumper which extends beyond the screw in axial direction, in particular for the supporting of an engine hood, a trunk door, or similar part of a motor vehicle in the closed position of the engine hood with-of the engine hood flush with the adjoining parts of the body.

As a result of the development of the present invention, a device of this type is obtained which is characterized by a broader field of use. To have the engagement surface of the rotary drive part continue into a rubber bumper provides the possibility of using the device, for instance, to support an engine hood of a motor vehicle. In this case, the hood itself represents the second structural part which rests on the rubber bumper. The bumper can always be brought into a precise position so that, when the hood or the trunk is closed, it is precisely flush with the adjoining parts of the body and accordingly improves the streamlining of the vehicle. The engagement surface of the rotary drive part can consist of a harder material than the adjoining rubber bumper. It is favorable from a mounting standpoint for the rubber bumper to have a central opening through which a screwdriver can be inserted. Although the rubber bumper extends in axial direction beyond the screw or the screw head, the screw, due to the central opening, can easily be brought by a tool into the tightened position, combined with a prior driving along of the rubber bumper up into a spaced position, and followed by a tightening of the screw, with the fastening of the device to the body. Another advantageous feature is characterized by the fact that the rubber bumper forms an outer surface of frustoconical shape which tapers down in axial direction so as to rest against a corresponding mating surface of a mounting gauge. It is thus possible to displace the device transverse to the axial direction, obtaining the precise size of the gap when the engine hood, trunk, or the like of a vehicle is closed. The frustoconical surface, together with the mating surface of the mounting gauge, results in a centering of the device. The receiving chamber for the screw head which is provided in the rubber bumper is then to be noted, the receiving chamber being of larger diameter than the screwdriver passage opening which opens in axial direction. Due to the elastic property of the rubber bumper, it is possible to insert the screw by the screw head into the screwdriver passage opening until the screw head comes into the region of the receiving chamber. The gauge for setting the axial position of a rubber bumper is characterized by a bumper mating surface which has a passage opening for a screwdriver which is aligned with the opening in the bumper. Therefore, after the centering of the bumper or bumpers by means of the gauge, it is possible to fix the bumper in the centered position, in the manner that the screwdriver is passed through the passage opening in the mating surface of the bumper in order then to enter into the opening in the bumper so as to reach the screw head which is present there. For example, the screw head can be a Phillips screw head into which the screwdriver engages in form-locked manner. The buffer mating surface here is the surface of an inner cone. Easy insertion of the mounting gauge results from the fact that it has a spring-actuated centering device for inserting the gauge, fixed in position, in a recess, particularly in the groove of an engine-compartment opening or a trunk opening of a motor vehicle. With the insertion of the gauge, the spring-actuated centering device at the same time effects the proper alignment so that the rubber bumpers are imparted their proper position. In detail, the centering device has link-driven support arms which rest against the side walls of the groove. Shifting of the gauge by itself after insertion is prevented in the manner that the support arms are held in the centering position by spring force. Finally, it should also be pointed out that the link mechanisms can be driven by a substantially oval cam. If the latter is provided with a handle, then, by merely reversing the handle, the support arms can enter into release position with respect to the side walls of the groove, making it possible to remove the gauge.

BRIEF DESCRIPTION OF THE DRAWINGS

With the above and other objects and other advantages in view, the present invention will become more clearly understood in connection with the detailed description of a preferred embodiment, when considered with the accompanying drawings of which:

FIG. 1 diagrammatically shows a section through the groove of an engine-compartment opening of a motor vehicle with the gauge brought into active position and two devices having rubber bumpers which are centered by it;

FIG. 2 shows, in longitudinal section, an enlarged detail of a device surrounded by a centering sleeve of the gauge; and FIG. 3 is a top view of the gauge which has been brought into aligned position.

DETAILED DESCRIPTION OF THE PREFERRED EMBODIMENT

The device designated generally 1 has a support part 2 and a rotary drive part 3 which extends coaxially to it. Seen in top view, these two parts 2, 3 are circular. From the base surface 4 of the support part 2, there extend two diametrically opposite clip projections 5 which pass with clearance through openings 6 in a first structural part 7. The first structural part 7 is a wall W of a groove of an engine compartment opening 8. Two such groove walls W are accordingly provided, which are continued by groove side walls 7'. The mudguards, not designated in detail, adjoin said side walls in known manner. Due to two groove walls, two devices 1 are also used in the embodiment shown, they being of identical development so that only one of these device will be described in detail.

The clip projections 5 hold fixed against rotation between each other a nut 5 having an internal thread, which nut cooperates with the threaded shank 10 of a screw 11. The threaded shank 10 passes, also with clearance, through a circular hole 17 in the structural part 7, so that the support part 2 can be displaced relative to the first structural part 7 transverse to the axial direction of the support part 2.

Opposite the clip projections 5, the support part 2 is provided with a stepped-down collar 13 which is flanked on the side of the outer edge by a helically ascending engagement surface 14. This is an engagement surface, which ascends to the left. This can be noted from FIG. 1 by looking at the device 1 shown on the left-hand side. In the sectional showing, the rear course of the engagement surface 14 is shown, which accordingly ascends to the right. Opposite this, the threaded shank 10 has a thread which ascends to the right. The threaded shank 10 passes with friction lock through an axial opening 15 in the rotary drive part 3. Concentric to the opening 15, the rotary drive part 3 forms an annular groove 16 for the entrance of the collar 13. On the other side of the annular groove 16, the rotary drive part 3 also forms an engagement surface 17 which ascends to the left and lies flat on the engagement surface 14 of the support part 2. The engagement surface 17 of the rotary drive part 3 is continued in a rubber bumper 18 for the supporting of an engine hood (not shown) which closes the engine-compartment opening 8. In the rubber bumper 18 there is a central opening 19 for the insertion of a screwdriver 20 shown in dot-dash line in FIG. 2. Adjoining the central opening 19 there is a receiving chamber 21 for the screw head 22 of the screw 11, which screw head 22 is larger in diameter than the screwdriver passage opening 18 which adjoins it in axial direction. The screw head 22 on its part is provided with a polygonal opening 22' into which the screwdriver 20 can engage in form-locked manner.

The rubber bumper 18 forms a tapering frustoconical surface 23 for resting against a corresponding mating surface 24 of a mounting gauge 25. The latter has a support plate 26 which, in mounting position, bears in the region of its front vehicle edge two centering sleeves 28 which are spaced apart from each other and in their turn form the mating surface 24. That surface is the surface of an inner cone. Thus it and the rubber bumper 18 enter into form-locked engagement with respect to each other.

The mounting gauge 25 in the embodiment shown has two spring-actuated centering devices 29 for the insertion, fixed in position,of the mounting gauge 25 into the groove of the engine-compartment opening 18. The centering devices 29 are controlled by an oval cam curve 30, present between them, on a body of revolution 31 which is mounted on the support plate 26. There is concerned an inside cam curve 30. A handle 32 is firmly connected with the body of revolution 31. Each centering device 29 has a link 33 which at its one end has a sensor roller 34 which, in its turn, cooperates with the cam curve 30. The other end of the link 33 is pivotally connected to a pair of toggle-lever links the support arms 35, 36 of which are coupled at the end by hinge pins 37 to link arms 38. The latter, in their turn, are mounted swingably around pins 39 on the side of the support plate. Each link arm 38 forms an acute angle with the support arm 35, 36 facing it. On the toggle-lever pivot point 40 the one end of a tension spring 41 fastened to the support plate 26 acts, as a result of which the support body 31 together with the cam curve 30 is so turned that the sensor roller 34 lies in the region of the largest diameter of the cam curve 30. In this position a centering roller 42 present on each pivot pin 37 rests against the groove side wall 7' of the engine compartment opening 8 and fastens the gauge 25 in its proper position. In order for displacement of the centering rollers 42 to be possible, the pivot pins 37 pass with clearance through holes 43 in the support plate 26.

On its bottom side, the support plate 26 is provided with two longitudinally extending resting ledges 44. By turning the handle 32 in the direction of the arrow shown in FIG. 3, the body of revolution 31 is displaced. Via the cam curve 30, the support arms 35, 36 are carried along against spring action. In hand with this, the link arms 38 are swung, so that the pivot pins 37 with the centering rollers 32 seated thereon come into position of release with respect to the groove side walls 7' and permit the removal of the gauge. In the same way, the handle 32 is swung when the mounting gauge 25 is to be inserted. Upon this insertion of the mounting gauge 25 there therefore takes place a forced alignment of the gauge with the centering sleeves 28 seated thereon, which in their turn move the devices 1 present with clearance with respect to the structural part 7 into the proper support position. The screwdriver 20 can now be passed through a centering-sleeve passage opening 45 aligned with the opening 19 in the rubber bumper 18, said opening continuing up into the support plate 26. It comes into engagement with the polygonal opening 22' in the screw head 22. By turning the screw 10, the rotary drive part 3 is carried along via the friction lock between the threaded shank 10 and the axial opening 15 in the rotary drive part 3, the rubber bumper 18 coming into its position of engagement with the mating surface 24 via the helical engagement surfaces 14, 17. When this position has been reached, then, by further rotation of the screw 11, the nut 9 is brought into clamped position with respect to the structural part 7, with the fixing in position of the device 1. The mounting gauge 25 can now be removed in the manner described. The rubber bumpers 18 are so aligned that they then support the second structural part, namely the engine hood, in accordance with their purpose. This hood has conical troughs into which the rubber bumpers 18 enter in form-locked manner and align the engine hood. The dimensions of the slot are thus precisely maintained. Furthermore, the engine hood is closed flush with the adjoining structural parts of the body.

I claim:

1. A device (1) for holding two structural parts in a spaced relationship with respect to each other, the device having a spacer for filling a distance between the two structural parts, wherein the spacer comprises:

a support part (2) to be brought into a position fixed in rotation with respect to a second structural part (7) of the two structural parts; and a rotary drive part (3) displaceable axially with respect to the support part (2) by rotation, a screw (11), and a rubber bumper;

wherein said support part (2) and said rotary drive part (3) meet along a helical engagement surface (14, 17) of said rotary drive part (3), said rotary drive part having a slope which is opposite a slope of a thread of said screw (11);

said screw (11), upon being screwed into an axial opening (15) in the rotary drive part (3), carries the latter along said engagement surface (17) of the rotary drive part (3) and into said rubber bumper (18); and said rubber bumper (18) extends beyond the screw (11) in axial direction, for supporting a hood component, including a vehicular engine hood or a vehicular trunk door, in a closed position of the hood component with the hood component flush with adjoining body parts of a body including a vehicular body, said rubber bumper having a tapered outer surface for alignment in a recess of a gauge employed in alignment of the two structural parts.

2. A device (1) for holding two structural parts in a spaced relationship with respect to each other, the device having a spacer for filling a distance between the two structural parts, wherein the spacer comprises:

a support part (2) to be brought into a position fixed in rotation with respect to a second structural part (7) of the two structural parts; and a rotary drive Dart (3) displaceable axially with respect to the support part (2) by rotation, a screw (11), and a rubber bumper;

wherein said support part (2) and said rotary drive part (3) meet along a helical engagement surface (14, 17) of said rotary drive part (3), said rotary drive part having a slope which is opposite a slope of a thread of said screw (11);

said screw (11), upon being screwed into an axial opening (15) in the rotary drive part (3), carries the latter along said engagement surface (17) of the rotary drive part (3) and into said rubber bumper (18); and said rubber bumper (18) extends beyond the screw (11) in an axial direction, for supporting a hood component, including a vehicular engine hood or a vehicular trunk door, in a closed position of the hood component with the hood component flush with adjoining body parts of a body including a vehicular body; and wherein the rubber bumper (18) has a central opening (19) for passage of a screwdriver (20).

3. A device according to claim 2, further comprising a receiving chamber (21), provided in the rubber bumper (18), for receiving a screw head (22), wherein a portion of the chamber (21) forms a screwdriver passage opening, the chamber being larger in diameter than the screwdriver passage opening (19), the screwdriver passage opening (19) opening in an axial direction of the chamber.

4. A device (1) for holding two structural parts in a spaced relationship with respect to each other, the device having a spacer for filling a distance between the two structural parts, wherein the spacer comprises:

a support Dart (2) to be brought into a position fixed in rotation with respect to a second structural part (7) of the two structural parts; and a rotary drive part (3) displaceable axially with respect to the support part (2) by rotation, a screw (11), and a rubber bumper;

wherein said support part (2) and said rotary drive part (3) meet along a helical engagement surface (14, 17) of said rotary drive part (3), said rotary drive part having a slope which is opposite a slope of a thread of said screw (11);

said screw (11), upon being screwed into an axial opening (15) in the rotary drive part (3), carries the latter along said engagement surface (17) of the rotary drive part (3) and into said rubber bumper (18); and said rubber bumper (18) extends beyond the screw (11) in an axial direction, for supporting a hood component, including a vehicular engine hood or a vehicular trunk door, in a closed position of the hood component with the hood component flush with adjoining body parts of a body including a vehicular body; and wherein the device is operative for use with a mounting gauge, and the rubber bumper (18) forms a frustoconical outer surface (23) which tapers down in axial direction for resting against a corresponding mating surface (24) of the mounting gauge (25).

5. A gauge for setting an axial position of a rubber bumper (18) in combination with a device (1) for holding two structural parts in a spaced relationship with respect to each other, the device having a spacer for filling a distance between the two structural parts, wherein the spacer comprises:

a support part (2) to be brought into a position fixed in rotation with respect to a second structural part (7) of the two structural parts; and a rotary drive part (3) displaceable axially with respect to the support part (2) by rotation, a screw (11), and said rubber bumper;

wherein said support part (2) and said rotary drive part (3) meet along a helical engagement surface (14, 17) of said rotary drive part (3), said rotary drive part having a slope which is opposite a slope of a thread of said screw (11);

said screw (11), upon being screwed into an axial opening (15) in the rotary drive part (3), carries the latter along said engagement surface (17) of the rotary drive part (3) and into said rubber bumper (18); and said rubber bumper (18) extends beyond the screw (11) in an axial direction, for supporting a hood component, including a vehicular engine hood or a vehicular trunk door, in a closed position of the hood component with the hood component flush with adjoining body parts of a body including a vehicular body; and further comprising a receiving chamber (21), provided in the rubber bumper (18), for receiving a screw head (22), wherein a portion of the chamber (21) forms a screwdriver passage opening, the chamber being larder in diameter than the screwdriver passage opening (19), the screwdriver passage opening (19) opening in an axial direction of the chamber; and wherein the gauge has a bumper mating surface (24) which has a passage opening (45) for receipt of a screwdriver (20), the opening (45) of the bumper mating surface being aligned with the passage opening (19) of the chamber (21) in the bumper (18).

6. The combination in accordance with claim 5, wherein the gauge comprises a mounting plate (26) with a sleeve (28) depending therefrom, the sleeve (28) having an inner cone; and the bumper mating surface (24) is a surface on the inner cone of the sleeve.

7. A gauge for setting an axial position of a rubber bumper (18) in combination with a device (1) for holding two structural parts in a spaced relationship with respect to each other, the device having a spacer for filling a distance between the two structural parts, wherein the spacer comprises:

a support part (2) to be brought into a position fixed in rotation with respect to a second structural part (7) of the two structural parts; and a rotary drive part (3) displaceable axially with respect to the support part (2) by rotation, a screw (11), and said rubber bumper;

wherein said support part (2) and said rotary drive part (3) meet along a helical engagement surface (14, 17) of said rotary drive part (3), said rotary drive part having a slope which is opposite a slope of a thread of said screw (11);

said screw (11), upon being screwed into an axial opening (15) in the rotary drive part (3), carries the latter along said engagement surface (17) of the rotary drive part (3) and into said rubber bumper (18); and said rubber bumper (18) extends beyond the screw (11) in an axial direction, for supporting a hood component, including a vehicular engine hood or a vehicular trunk door, in a closed position of the hood component with the hood component flush with adjoining body parts of a body including a vehicular body; and wherein the rubber bumper (18) forms a frustoconical outer surface (23) which tapers down in axial direction for resting against a corresponding mating surface (24) of the gauge (25); and the gauge (25) has a spring-loaded centering device (29) enabling an emplacement of the gauge (25), fixed in position, into a groove of an engine-compartment opening (8) or a trunk opening on the body of a motor vehicle.

8. The combination in accordance with claim 7, wherein the centering device (29) has link-driven support arms (35, 36) for resting on side walls of the groove.

9. A gauge for setting the axial position of a rubber bumper (18) in accordance with claim 8, wherein the support arms (35, 36) are held in centering position by spring force.

10. The combination in accordance with claim 8, further comprising a cam drive, and wherein the link driven support arms are drivable by a substantially oval-shaped cam curve (30) of the cam drive.

* * * * *